United States Patent [19]
Lilly

[11] Patent Number: 5,151,575
[45] Date of Patent: Sep. 29, 1992

[54] ELECTRICALLY HEATED COLOR CRAYON POINTER

[76] Inventor: Nathaniel W. Lilly, P.O. Box 67, Stratford, Wash. 98853

[21] Appl. No.: 568,365

[22] Filed: Aug. 15, 1990

[51] Int. Cl.$^5$ .................. B29C 33/02; H05B 3/00
[52] U.S. Cl. .................... 219/385; 156/499; 219/242; 219/390; 219/421; 425/383; 425/392
[58] Field of Search .............. 219/385, 390, 242, 421; 425/392, 383; 156/499

[56] References Cited

U.S. PATENT DOCUMENTS

| | | | |
|---|---|---|---|
| 1,754,993 | 4/1930 | Fenton | 425/392 |
| 2,733,478 | 2/1956 | Schwieger | 425/392 |
| 3,436,171 | 4/1969 | Weichselbaum et al. | 219/242 X |
| 4,103,145 | 7/1978 | Oliveri | 219/242 X |
| 4,456,451 | 6/1984 | Vosper | 425/392 |
| 4,827,695 | 5/1989 | Logan | 156/499 |

*Primary Examiner*—Anthony Bartis
*Attorney, Agent, or Firm*—Wells, St. John & Roberts

[57] ABSTRACT

A color crayon pointer for reforming the point on used color crayons includes an elongated horizontally disposed housing (21) extending from a rear end (24) to a front end (22) along a pointing axis, with the front end having an opening aligned with the pointing axis through which the crayon end to be pointed is inserted. A metallic anvil (40) heated by an electric heater (44) is mounted in the housing and has a conical recess (42) concentric with the pointing axis for shaping the end of the crayon inserted through housing opening. A crayon guide (36) having a guide collar (37) spaced forward of the housing opening and the anvil (40) prevents inadvertent user contact with the anvil (40) while also insuring proper alignment of the crayon with the anvil recess (42) as it is inserted into the housing. The housing (21) is made of plastic and has vents (56,58) to provide efficient insulation and air cooling for the heating element (44) and anvil (40) to maintain the outer wall (26) of the housing near room temperature.

13 Claims, 3 Drawing Sheets

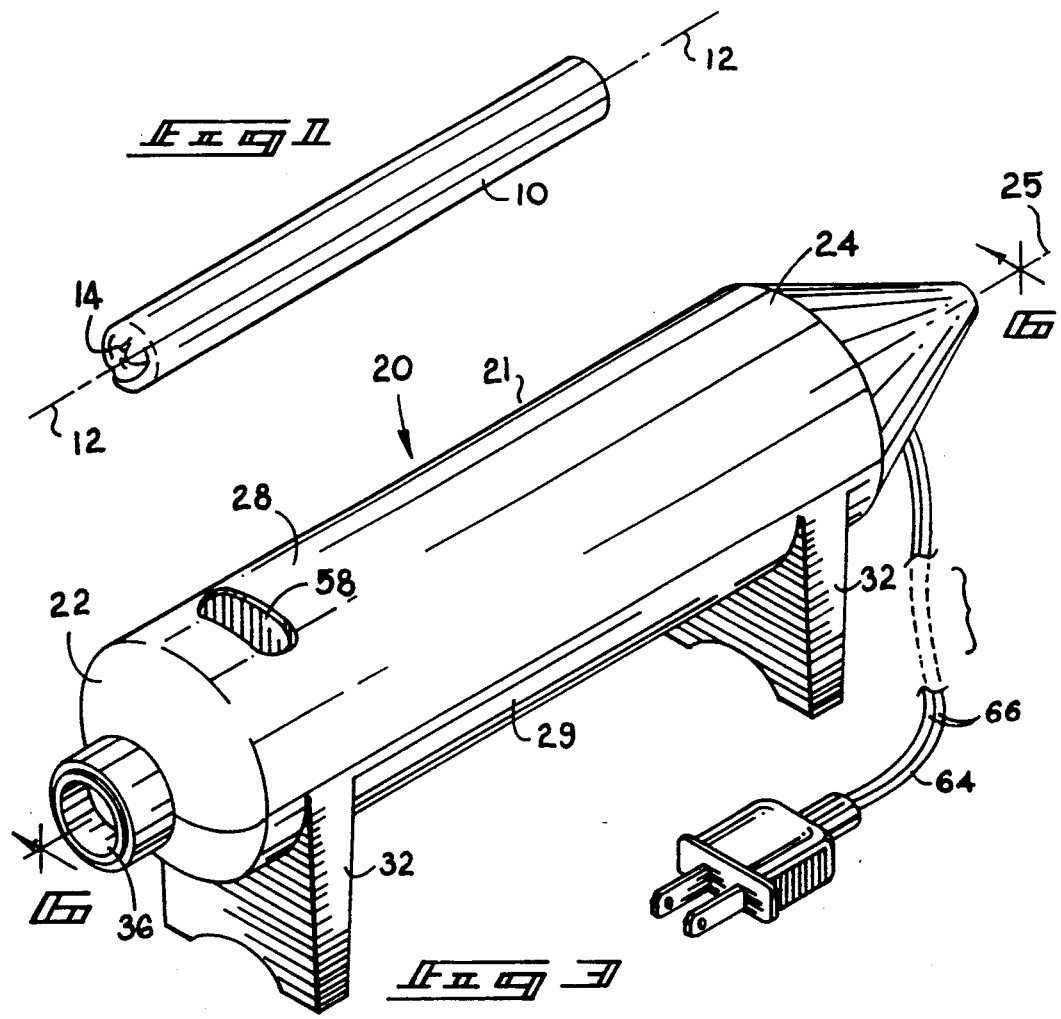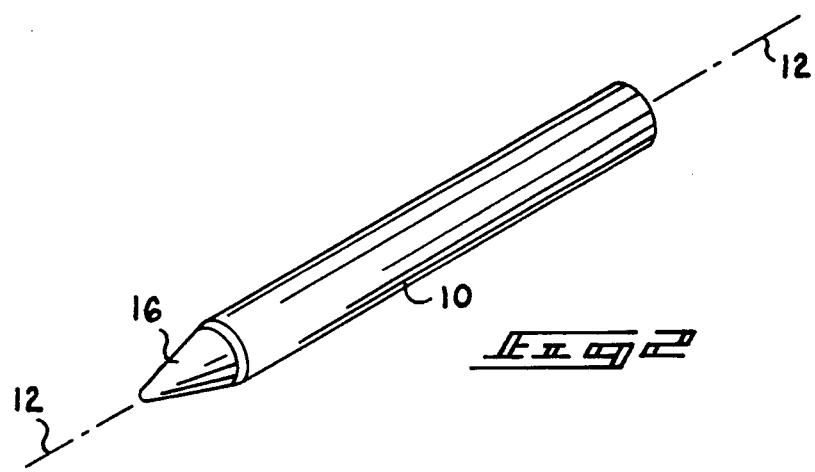

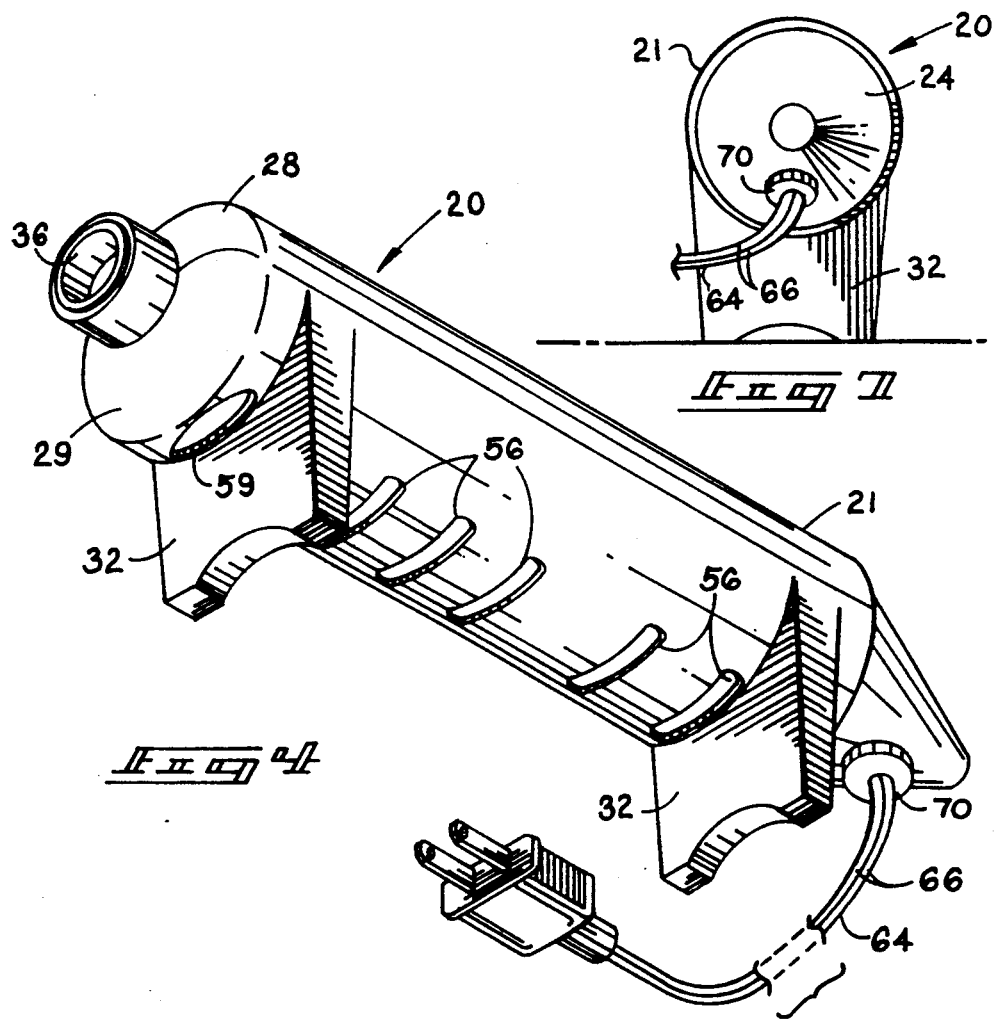
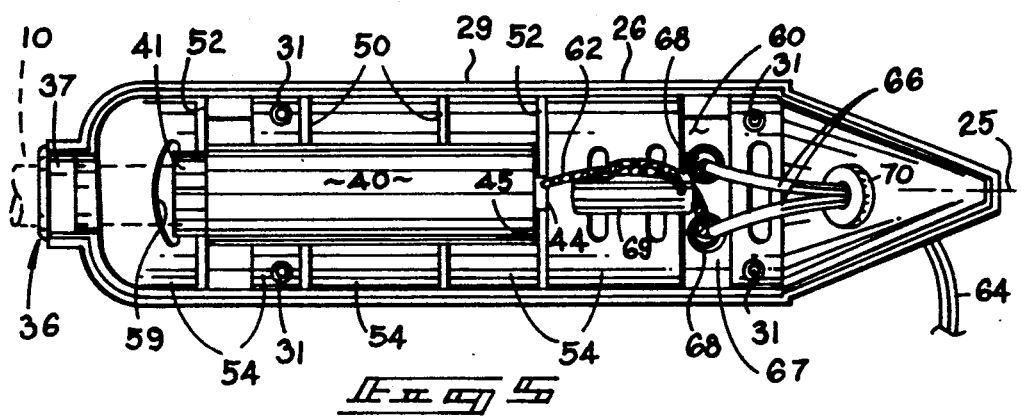

ELECTRICALLY HEATED COLOR CRAYON POINTER

TECHNICAL FIELD

This invention relates to color crayon pointers.

SUMMARY OF THE INVENTION

The Applicant's invention pertains to a color crayon pointer for pointing an end of an elongated color crayon that has a known melting point. The pointer includes a housing that extends from a rear end to a forward end in which the forward end has an opening aligned with a pointing axis through which the crayon end is inserted. A heat conducting anvil is mounted within the housing having a pointing cavity for receiving the end of the crayon when the crayon is inserted through the housing opening.

A heating element is associated with the heat conducting anvil for heating the anvil to a temperature above the melting point of the color crayon to melt the end of the color crayon to point the end to a desired shape. The color crayon pointer housing has a crayon guide at the forward end spaced from the housing opening and from the heat conducting anvil. The crayon guide is aligned with the pointing axis for guiding the color crayon coaxially with the pointing axis so that the conformed end of the crayon is coaxial with the longitudinal central axis of the crayon.

BACKGROUND OF THE INVENTION

Color crayons and wax markers are in common use, especially by school-age children. While such fusible color crayons are inexpensive and easy to use accurate color drawing is difficult unless the end of the crayon is rather sharply pointed. Generally a new crayon maintains its original sharp point only for a short period of use and quickly becomes dull or blunt. Consequently, there is a need for a device which will efficiently restore a rather sharp point to the dull or blunt end of color crayons.

Conventional pointers, often included with packages of color crayons, use a blade to trim the crayon end. The crayon is placed into a tapered recess which positions the crayon against the blade. The user then turns the crayon until the blade has cut or shaved enough material to restore a sharpened end to the crayon. Not only is a substantial amount of otherwise useable crayon material wasted, but the device requires significant user time and effort.

Efforts have been made to provide pointers that melt and reshape a dull crayon end rather than cutting or shaving it. For example, the W. N. Herbert et al. U.S. Pat. No. 2,580,092 and the LaRue U.S. Pat. No. 4,564,351 illustrate such previous efforts which show electrically powered heating elements for melting and reshaping crayon ends. In both patents, a cone-shaped recess is maintained at a temperature above the melting point of the color crayon. As the end of the crayon is forced into the recess, it melts and is gradually molded into the pointed shape of the recess.

The applicant has sought to improve the operation of heat operated color crayon pointers and has invented a pointer which avoids the inefficiencies and inaccuracies of previous crayon pointing devices. The applicant provides a color crayon pointer that can be more readily manufactured at a considerable savings in cost which enables the pointer to be sold at a price that makes the pointer more affordable to children.

BRIEF DESCRIPTION OF THE DRAWINGS

The preferred embodiment of the invention is illustrated in the accompanying drawings, in which:

FIG. 1 is an isometric view of a used and dull color crayon;

FIG. 2 is an isometric view of a reformed pointed color crayon;

FIG. 3 is an isometric top view of a preferred embodiment of the color crayon pointer;

FIG. 4 is an isometric bottom view of the pointer shown in FIG. 3;

FIG. 5 is a plan view of the pointer with an upper housing section removed to illustrate the interior of the pointer, with dashed lines showing an inserted color crayon;

FIG. 7 is an end view of the pointer from its rear end.

DETAILED DESCRIPTION OF THE PREFERRED EMBODIMENT

Figure 6:
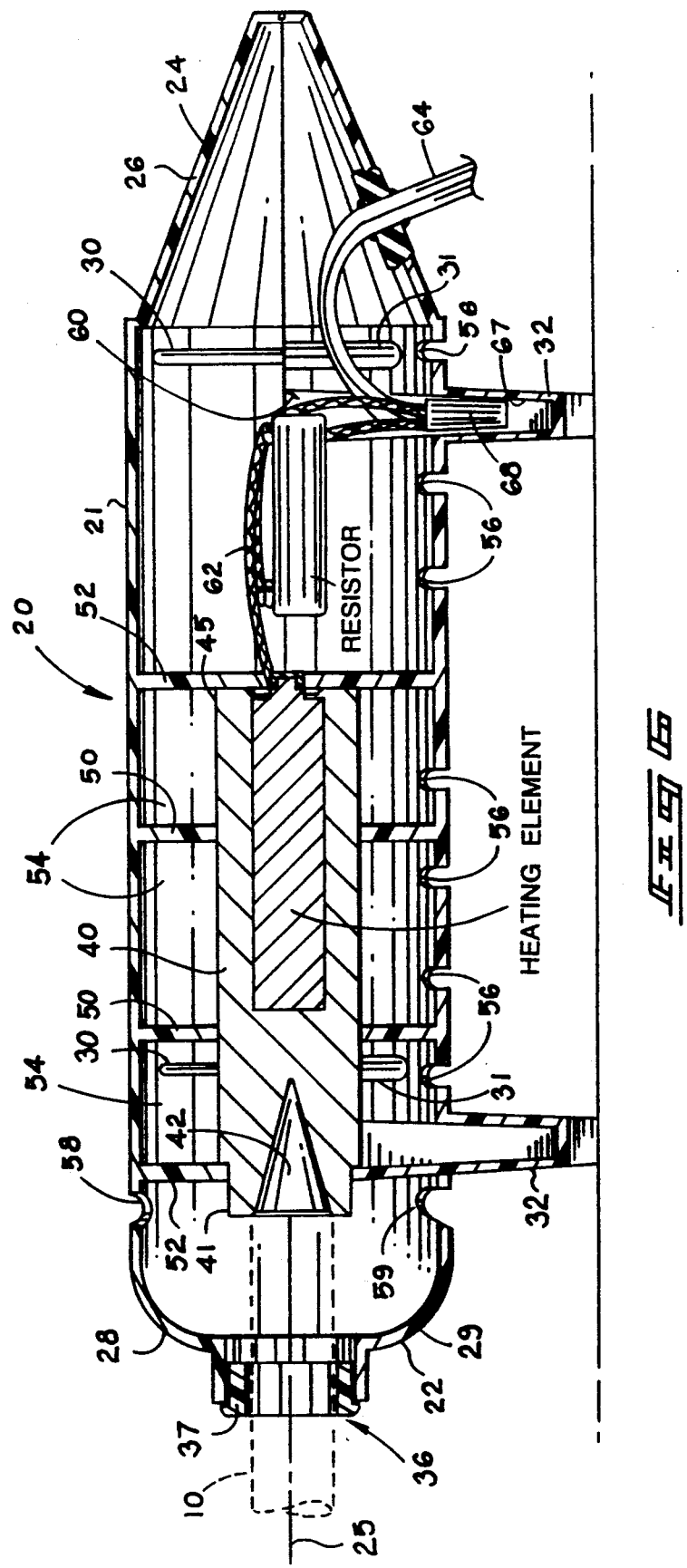
FIG. 6 is a vertical cross section of the pointer, taken along line 6—6 of FIG. 3, with dashed lines showing an inserted color crayon.

A preferred embodiment of the color crayon pointer is illustrated in FIGS. 3 and 4 and is generally designated with the numeral 20. The pointer 20 is intended to recondition used or dull fusible color crayons 10 illustrated in FIG. 1.

Commonly used color crayons 10 (FIGS. 1 and 2) are shaped as elongated cylinders around a central longitudinal axis 12. The crayons are molded from wax or wax-like material which melts at about 160 degrees Fahrenheit. FIG. 1 shows a crayon 10 after use, with a dulled end 14. FIG. 2 shows a color crayon 10 whose dull end 14 has been replaced with a reformed end 16 which has been re-pointed by the pointer 20. As will become apparent, this invention simplifies re-pointing the crayon 10 and results in a pointed end 16 which is aligned, both laterally and angularly, with the central longitudinal axis 12 of the crayon 10.

The external appearance of the preferred embodiment of this invention is shown in FIGS. 3 and 4. The particular exterior shape of the color crayon pointer 20 (resembling an actual color crayon) was chosen to be somewhat decorative, although the cylindrical shape is also functional and convenient for manufacture and use.

The pointer 20 has a housing 21 formed by a cylindrical outer wall 26 having a central axis 25 that is referred to as the pointing axis. The housing 21 extends from a forward end 22 to a rear end 24.

The housing 21 is preferably molded from a heat-insulating and fire-retardant material such as fire-retardant ABS plastic. For convenience in molding and assembly, the housing 21 is constructed of an upper section 28 and a lower section 29. Four pins 30, shown in FIG. 6, extend downward from the upper section 28 and are received by the upward extending sockets 31, shown in FIGS. 5 and 6. The inner diameter of the sockets 31 is slightly smaller than the outer diameter of the pins 30, providing an interference it to hold the two sections securely together once they are assembled. Legs. 32 are molded in the lower section 29 to rest upon any suitable support surface (not shown).

The housing 21 at the forward end 22 necks inward to a crayon guide 36. The crayon guide 36, at the forward end of the housing, preferably includes a cylindrical collar 37 which is concentric with the pointing axis and guides a crayon along the pointing axis as it is inserted into the color crayon pointer. The collar 37 is a unitary element and is attached to the housing sections 28 and 29 rather than being integral with the molded sections 28 or 29 so that different collar sizes can be used with the same mold to accommodate different diameter color crayons 10.

The pointer 20 includes an elongated cylindrical heat conducting anvil 40, illustrated in FIG. 6, that is mounted within the housing 21 and centered with respect to the pointing axis 25. A pointing cavity 42 is formed in a forward end 41 of the anvil 40. The pointing cavity 42 is formed in a desired end shape of the pointed crayon 11. Preferably, the pointing cavity 42 is generally conical in shape having a taper angle complementing with the taper of the original point of the crayon. Both the anvil 40 and the pointing cavity 42 are coaxial with the pointing axis 25 of the color crayon pointer 20.

The pointer 20 has a conventional cylindrical heating element 44 located within a bore in a rear end 45 of the anvil 40. The heating element 44 is chosen to maintain the temperature of the anvil 40 at slightly above the melting point of the color crayon, preferably in the range of 165 to 170 degrees Fahrenheit. In this embodiment, a resistor 69 is provided in series with the heating element to control or limit the maximum temperature of the heating element 44. In an alternate embodiment the anvil 40 and the heating element 44 may be integrally formed and the resistor 69 may be eliminated. In the illustrated embodiment a Vulcan 50 watt/120 volt heating element 44 is provided, utilizing, in series, an 8 watt/1500 ohm resistor 69.

The housing 21 has longitudinally spaced internal ribs 50 extending radially inward from the outer wall 26 to engage and surround the anvil 40, thus positioning the anvil 40 coaxially with the pointing axis 25. Spaced bulkheads 52 similarly engage and support each end of the anvil 40 for supporting the anvil 40 coaxially with the pointing axis 25 and for preventing longitudinal movement of the anvil 40 relative to the housing 21. The longitudinally spaced internal ribs 50 and the bulkheads 52 subdivide the interior of the housing 21 form isolated internal cylindrical cavities 54 surrounding the anvil 40.

The housing 21 includes vent apertures 56 formed in the housing 21 communicating with the cavities 54 for permitting air to circulate into and out of the cavities 54 to air cool the anvil 40. The continuous air cooling prevents the anvil 40 and resistor 69 from overheating and maintains the outer wall 26 near room temperature. Preferably, the vent apertures 56 are formed in the lower section 29 of the housing 21.

The housing 21 includes a view aperture 58 (FIG. 3) in the upper section 28 of the housing 21 at the forward end 22 forward of the heat conducting anvil 40 to allow the user to see the end 14 of an inserted crayon and the forward end 41 of the anvil. A drain aperture 59 is formed at the forward end 22 of the lower section 29 of the housing 21 directly below the forward end 41 of the anvil 40 to allow any excess melted wax to drain from the pointing cavity 42 and pass from the housing 21. It should be noted that each of the apertures 56, 58, and 59 are sufficiently small in cross section to prevent children from inserting their fingers therethrough to touch the heated anvil 40.

The housing 21 has an electrical connector space 60 formed at the rear end 24 of the housing 21 within one of the legs 32. An electrical cord 64, capable of being connected to an external electrical power source, enters the housing through a grommet 70 at its rear end 24. End wires 66 of the electrical cord 64 extend into the electrical connector space 60. Likewise, the heating element 44 has heat-protected electrical leads 62 that extend rearward from the anvil 40 to the electrical connector space 60. Respective wires 66 and leads 62 are electrically interconnected by electrical connectors 68, typically conventional wire nuts. In this manner the end wires 66 are maintained spaced from the heating element 44 to prevent the wires 66 from being heated or from coming in contact with the heating element 44.

Thus, the unique structure of the housing 21 provides a superior environment for various internal elements. The internal cavities 54 and associated vent apertures 56 provide uniform and efficient air cooling of the heating element 44 and anvil 40. This not only allows the anvil 40 to be maintained at a constant temperature, but also minimizes dissipation of heat through the housing itself—thereby preventing the housing from becoming dangerously hot. In addition, the electrical connector space 60 provides room for electrical wiring and connections while providing an anchoring point for electrical connectors 68.

In operation, a color crayon 10 having a dull end 14 is inserted through the crayon guide 36 and pressed into the pointing cavity 42. The heating element slowly melts the end of the dull crayon and reforms it into a sharp point in which the point is accurately centered with respect to the cylindrical axis 12 of the crayon 10. While most of the heated crayon material remains part of the pointed crayon, any excess melted material left in the pointing cavity 42 drains out through the drain aperture 62.

It should be noted that the size of the pointing cavity 42 and inner diameter of the guide 36 may be varied and chosen when the pointer 20 is assembled to adapt the crayon pointer 20 for use with crayons 10 having different outside diameters. Because of the housing structure, the same mold may be used for the housing regardless of the components chosen.

Spacing the crayon guide 36 away from the pointing cavity 42 provides an important safety feature by preventing inadvertent user contact with the heat conducting anvil 40. This significant benefit is obtained without detriment to the efficient use of the device. Indeed, the guide 36, its placement, and the view aperture 58 not only assist in aligning the crayon, but virtually *guarantee* accurate alignment of the crayon with the pointing axis 25. Any potential disadvantage of the inaccessible anvil is negated by incorporating the view aperture 58, which allows the user to see the forward end 41 of the anvil 40, and the drain aperture 59, which allows melted wax to drain from the color crayon pointer.

The pointer 20 provides a useful, accurate, and efficient device for reforming the point on a used color crayon. The pointer is safe, efficient, and simple to use. In addition, it reliably creates a crayon point which is aligned with the crayon's central axis.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A color crayon pointer for pointing an end of an elongated color crayon having a longitudinal central axis wherein the coloring crayon has a known melting point, comprising:

a housing extending from a rear end to a forward end along a pointing axis with the forward end having an opening aligned with the pointing axis through which the crayon end to be pointed is inserted;

a heat conducting anvil mounted within the housing having a pointing cavity of a desired shape formed therein concentric with the pointing axis adjacent to the forward end for receiving the end of the color crayon when inserted through the housing opening;

a heating element associated with the heat conducting anvil for heating the anvil to a temperature above the melting point of the color crayon to melt the end of the color crayon and conform the end point to the desired shape of the pointing cavity; and said housing having a crayon guide at the forward end spaced forward of the housing opening and of the heat conducting anvil and aligned with the pointing axis for guiding the color crayon coaxially with the pointing axis so that the conformed end point is coaxial with the longitudinal central axis of the color crayon.

2. The color crayon pointer as defined in claim 1, wherein the housing has (1) an outer wall spaced from the heat conducting anvil and (2) internal ribs extending inward from the outer wall supporting the heat conducting anvil in alignment with the pointing axis and spaced from the outer wall.

3. The color crayon pointer as defined in claim 2, wherein the outer wall of the housing has a plurality of vent apertures formed therein for air cooling the heat conducting anvil.

4. The color crayon pointer of claim 3, wherein the housing has an upper section and a lower section and wherein the vent apertures are formed in the lower section.

5. The color crayon pointer as defined in claim 2, wherein the internal ribs are longitudinally spaced from each other forming internal cavities between the outer wall and the heat conducting anvil and wherein the outer wall has a plurality of vent apertures therein communicating with the internal cavities for air cooling the heat conducting anvil.

6. The color crayon pointer of claim 1, wherein the housing has a drain aperture formed therein beneath and aligned with the front edge of the pointing cavity for enabling excess melted crayon material to drain therethrough.

7. The color crayon pointer of claim 1, wherein the housing has a view aperture formed therein at the forward end for enabling a user to view the pointing cavity and to facilitate the pointing of the color crayon end.

8. The color crayon pointer of claim 1, wherein the housing comprises two sections which are mated around the heat conducting anvil and in a plane parallel with the pointing axis.

9. The color crayon pointer of claim 7, wherein:

the color crayon has a known outside diameter; and the crayon guide comprises a cylindrical collar having an inner diameter complementary to the known outside diameter of the color crayon and aligned concentrically with the pointing axis for receiving and guiding the crayon end to the pointing cavity with the longitudinal axis of the crayon coaxial with the pointing axis.

10. The color crayon pointer of claim 1, wherein the crayon guide comprises a cylindrical collar aligned concentrically with the pointing axis for receiving and guiding the crayon end to the pointing cavity with the longitudinal axis of the crayon coaxial with the pointing axis.

11. The color crayon pointer as defined in claim 1, wherein the housing has legs for supporting the heat conducting anvil elevated above a support surface and wherein one of the legs is hollow having an electrical connector space and wherein the heating element has heat protected electrical leads extending therefrom into the electrical connector space and wherein the color crayon pointer further comprises:

(1) an electrical cord extending therefrom for connecting to an electrical power source and in which the electrical cord has electrical wires extending into the electrical connector space; and (2) electrical connectors mounted in the electrical connector space interconnecting the electrical wires of the electrical cord with the heat protected electrical leads of the heating element.

12. The color crayon pointer as defined in claim 1, the housing further comprising:

(1) an outer wall spaced from the heat conducting anvil;

(2) ribs extending inward from the outer wall for supporting the heat conducting anvil in alignment with the pointing axis and spaced from the outer wall; and (3) bulkheads extending inward from the outer wall engaging the heat conducting anvil for preventing the heat conducting anvil from moving relative to the housing.

13. The color crayon pointer as defined in claim 12, wherein the outer wall further comprises vent apertures formed therein intermediate to the ribs for air cooling the heat conducting anvil.

* * * * *